US012736821B2

(12) United States Patent
Crews et al.

(10) Patent No.: US 12,736,821 B2
(45) Date of Patent: Sep. 15, 2026

(54) ELECTRONIC DEVICES WITH FABRIC BANDS

(71) Applicant: Apple Inc., Cupertino, CA (US)

(72) Inventors: Kathryn P. Crews, Menlo Park, CA (US); Charlotte M. Baravian, Campbell, CA (US); Lia M. Uesato, San Jose, CA (US); Benjamin A Shaffer, San Jose, CA (US); Robert V Tang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 18/346,726

(22) Filed: Jul. 3, 2023

(65) Prior Publication Data

US 2024/0045219 A1 Feb. 8, 2024

Related U.S. Application Data

(60) Provisional application No. 63/395,273, filed on Aug. 4, 2022.

(51) Int. Cl.
*G02B 27/01* (2006.01)
*A41D 20/00* (2006.01)

(52) U.S. Cl.
CPC ......... *G02B 27/0176* (2013.01); *A41D 20/00* (2013.01)

(58) Field of Classification Search
CPC ......... A41D 20/00; A41D 1/005; A42B 1/245
USPC .................................. 2/DIG. 11, 171.8, 181
See application file for complete search history.

(56) References Cited

U.S. PATENT DOCUMENTS 5,826,277 A * 10/1998 McConville ...... A61F 13/01008 2/184
6,345,395 B1 * 2/2002 Chilton .................... A42B 1/12 2/202
9,081,210 B2 7/2015 Adams et al.
10,412,845 B2 9/2019 Chang et al.
(Continued)

FOREIGN PATENT DOCUMENTS

JP 2003102894 A 4/2003
JP 2006070409 A 3/2006
(Continued)

OTHER PUBLICATIONS

Reversible Headbands. TheLongThread.com. URL = "https://thelongthread.com/2008/06/02/reversible-headbands/". Accessed Jul. 25, 2025. (Year: 2008).*

*Primary Examiner* — Clinton T Ostrup
(74) *Attorney, Agent, or Firm* — Treyz Law Group, P.C.; Kendall P. Woodruff

(57) ABSTRACT

A head-mounted device may include a main housing portion and a fabric head band for supporting the head-mounted device on a user's head. The fabric head band may include first and second flat knit end portions without ribs and a ribbed fabric extending between the first and second flat knit end portions. The ribbed fabric portion may include a stretchable inner fabric layer formed from mesh fabric. A first set of ribs may be formed on a first side of the inner fabric layer and a second set of ribs may be formed on a second opposing side of the inner fabric layer. The head band may include one or more pockets. A pocket along the border of the head band may receive a cord. A pocket at one of the end portions may receive a user input device or other electronic component.

18 Claims, 9 Drawing Sheets

(56) References Cited

U.S. PATENT DOCUMENTS 10,423,241 B1 9/2019 Pham et al.
10,863,637 B1 12/2020 Pickett et al.
10,925,333 B1 2/2021 McKenzie
11,181,748 B1 11/2021 Williamson et al.
11,274,382 B2 3/2022 Podhajny et al.
2006/0185062 A1* 8/2006 Peng .................... H04R 5/0335 2/209.13
2006/0251283 A1 11/2006 Yeh
2008/0163408 A1 7/2008 Tseng
2009/0175482 A1 7/2009 Crutcher
2011/0273662 A1 11/2011 Hwang et al.
2013/0160187 A1 6/2013 Crutcher
2015/0135418 A1* 5/2015 Schermerhorn ..... H04R 1/1091 381/334
2016/0299346 A1 10/2016 Allin et al.
2016/0370590 A1 12/2016 Fujishiro
2019/0162971 A1 5/2019 Chien
2019/0346682 A1 11/2019 Kang et al.
2019/0369659 A1 12/2019 Hu et al.
2020/0404996 A1* 12/2020 Kelly ....................... A42C 5/04
2021/0058705 A1 2/2021 Carr et al.
2021/0211640 A1 7/2021 Bristol et al.
2022/0043273 A1 2/2022 Ellis et al.
2022/0192295 A1* 6/2022 Phillips .................... A42C 5/00
2022/0412507 A1 12/2022 Roig et al.

FOREIGN PATENT DOCUMENTS

JP 2017529722 A 10/2017
WO WO-2010015030 A1 * 2/2010 ............. A41D 20/00
WO 2022132960 A1 6/2022

* cited by examiner

ELECTRONIC DEVICES WITH FABRIC BANDS

This application claims the benefit of provisional patent application No. 63/395,273, filed Aug. 4, 2022, which is hereby incorporated by reference herein in its entirety.

FIELD

This relates generally to fabric bands and, more particularly, to fabric bands for wearable electronic devices such as head-mounted devices.

BACKGROUND

Electronic devices such as head-mounted devices are configured to be worn on a head of a user. A head-mounted device may have left and right optical systems for presenting images to a user's left and right eyes. The optical systems may be mounted in a head-mounted housing. Conventional head-mounted devices can be uncomfortable and cumbersome to wear.

SUMMARY

Electronic devices such as head-mounted electronic devices may include a main housing portion. Displays and lenses may be mounted in the main housing portion. The displays may be configured to present images that are viewable from eye boxes.

The head-mounted device may include a fabric head band for supporting the head-mounted device on a user's head. The fabric head band may include first and second flat knit end portions without ribs and a ribbed fabric portion that extends between the first and second flat knit end portions. The ribbed fabric portion may include a stretchable inner fabric layer formed from mesh fabric. A first set of ribs may be formed on a first side of the inner fabric layer and a second set of ribs may be formed on a second opposing side of the inner fabric layer. The fabric head band may be configured to stretch in a first direction, and the ribs may extend along a second direction that is perpendicular to the first direction. Openings may pass through the ribs so that the head band remains breathable and lightweight without sacrificing cushioning.

The head band may include one or more pockets. A pocket along the border of the head band may receive a cord. A pocket at one of the end portions may receive a user input device or other electronic component. The pocket may be located in the flat knit regions of the head band and/or the ribbed portion of the head band. A pocket may be formed in the ribbed fabric by separating the inner mesh fabric into first and second inner fabric layers, with the pocket located between the first and second inner fabric layers. A first set of ribs may be supported by the first inner fabric layer, and a second set of ribs may be supported by the second inner fabric layer.

DETAILED DESCRIPTION

An electronic device such as a head-mounted device may have a front face that faces away from a user's head and may have an opposing rear face that faces the user's head. The head-mounted device may include a main housing portion with optical modules that provide images to the user's eyes. A fabric head band may be used to attach the main housing portion to the user's head. The fabric head band may include a stretchable inner layer such as a mesh fabric layer. First and second sets of ribs may be formed on respective first and second opposing sides of the stretchable inner layer. The ribs may provide cushion while also allowing airflow through the fabric head band. One or more pockets may be formed in the fabric head band to accommodate components such as electrical components (e.g., one or more input-output devices for the head-mounted device) and/or non-electrical components (e.g., a cord for providing structure and/or adjustability to the fabric band).

Figure 1:
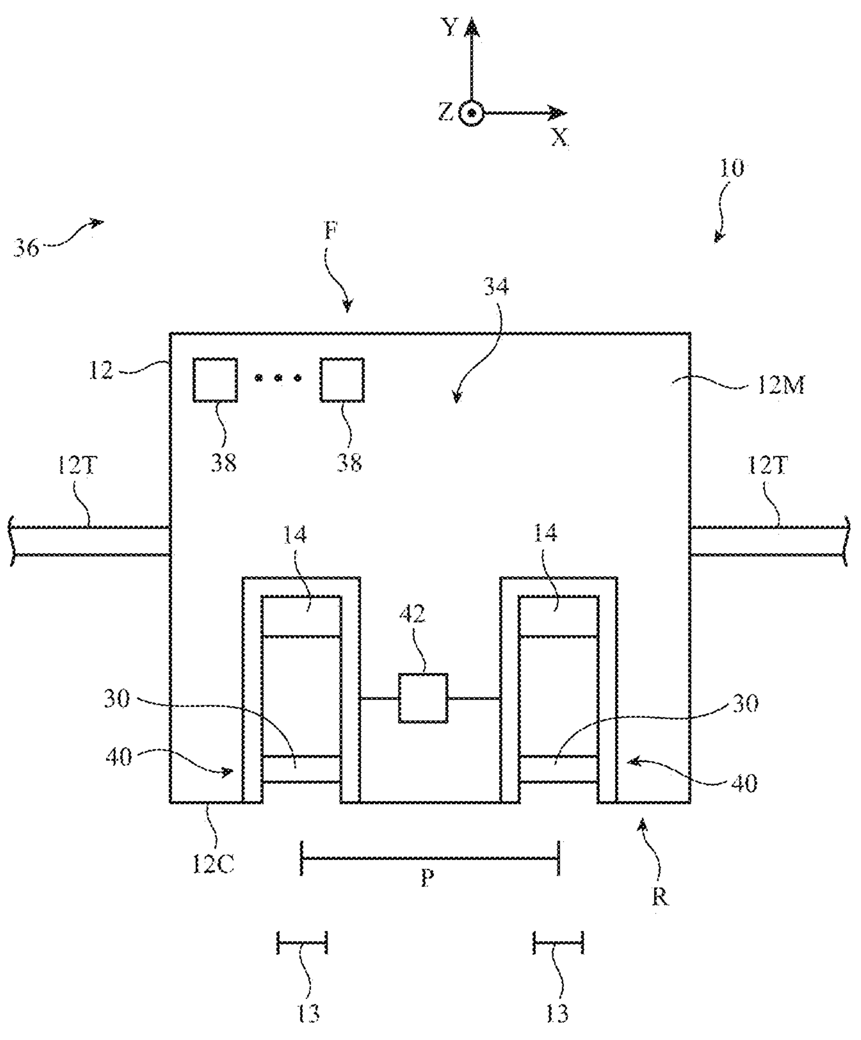
FIG. 1 is a top view of an illustrative head-mounted device in accordance with an embodiment.

A top view of an illustrative head-mounted device that may include a fabric head band is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T (sometimes referred to as temple housing structures or temple housing portions) may be formed from fabric, polymer, metal, and/or other material. Support structures 12T may form a strap or other head-mounted support structures that help support device 10 on a user's head. Some or all of temple housing portions 12T may overlap a user's temples when device 10 is worn on the user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as curtain 12C. In an illustrative configuration, curtain 12C includes a fabric layer that separates interior region 34 from the exterior region to the rear of device 10. Other structures may be used in forming curtain 12C, if desired. The presence of curtain 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30. Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses 30 may include one or more lens elements for providing image light from displays 14 to respective eyes boxes 13. Lenses may be implemented using refractive glass lens elements, using mirror lens structures (catadioptric lenses), using holographic lenses, and/or other lens systems. When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance P. To provide device 10 with the ability to adjust the interpupillary spacing between modules 40 along lateral dimension X and thereby adjust the spacing P between eye boxes 13 to accommodate different user interpupillary distances, device 10 may be provided with one or more actuators 42. Actuators 42 can be manually controlled and/or computer-controlled actuators (e.g., computer-controlled motors) for moving support structures 32 relative to each other.

Figure 2:
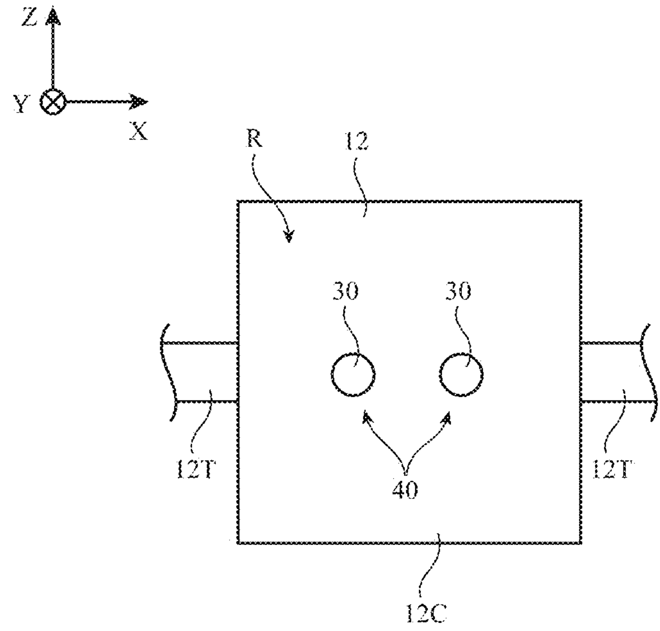
FIG. 2 is a rear view of an illustrative head-mounted device in accordance with an embodiment.

As shown in FIG. 2, curtain 12C may cover rear face R while leaving lenses 30 of optical modules 40 uncovered (e.g., curtain 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other. To prevent undesired wrinkling and buckling of curtain 12C as optical modules 40 are moved relative to rigid portions of housing 12M and relative to each other, a fabric layer or other cover layer in curtain 12C may be configured to slide, stretch, open/close, and/or otherwise adjust to accommodate optical module movement.

Figure 3:
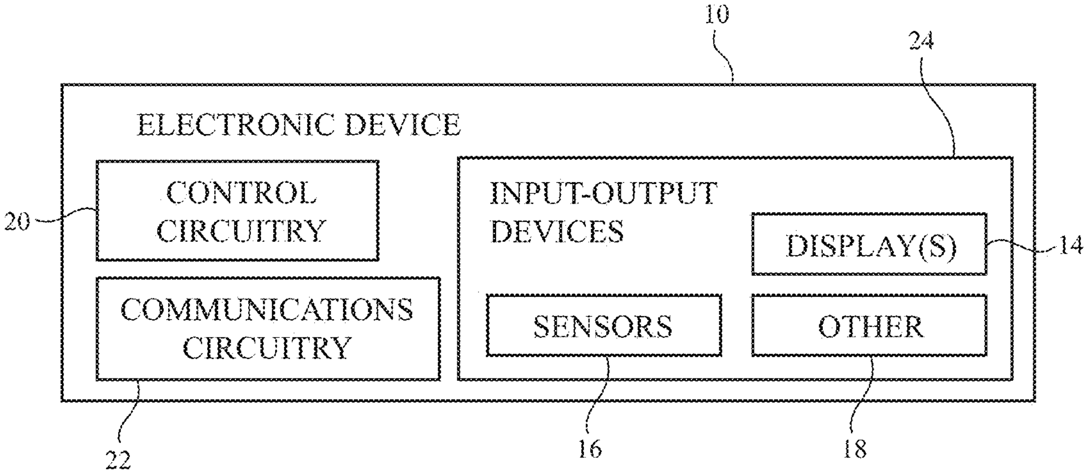
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
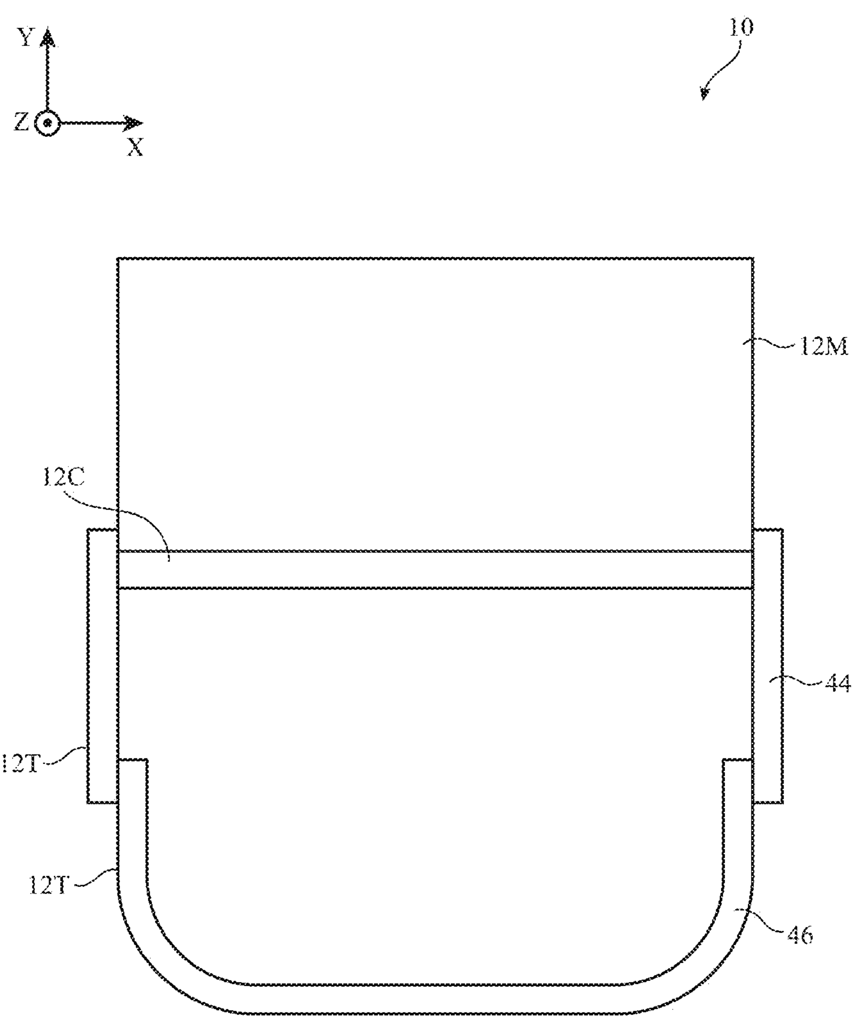
FIG. 4 is a top view of an illustrative head-mounted device having a head band in accordance with an embodiment.

FIG. 4 is a top view of device 10 showing how a head band may be used to help attach head-mounted device 10 to a user's head. As shown in FIG. 4, device 10 may include main housing portion 12M which is configured to be mounted on a user's head using temple housing portions 12T. If desired, one or more electronic components may be mounted in temple housing portions 12T such as wireless charging circuitry, input-output devices (buttons, touch sensors, rotating knobs, etc.), sensors, etc. In other arrangements, temple housing portions 12T may be free of electronic components.

Temple housing portions 12T may be formed using rigid support structures and/or flexible materials. As shown in FIG. 4, for example, temple housing portions 12T may include rigid supports such as rigid support structures 44 and flexible fabric support structures such as head band 46. Rigid support structures 44 may include a left temple portion and a right temple portion coupled to main housing portion 12M. Head band 46 may wrap at least partially around the user's head and may have a first end coupled to the left temple portion of support structures 44 and a second opposing end coupled to the right temple portion of support structures 44. Head band 46 (sometimes referred to as a fabric band, a fabric strap, a head strap, etc.) may wrap around the back of a user's head, over the top of a user's head, and/or may otherwise couple main housing portion 12M to the user's head. Arrangements in which head band 46 includes multiple bands extending across different portions of the user's head may also be used (e.g., to form upper and lower straps across the back of the head, to form a strap over the top of the head and a strap across the back of the head, etc.). Arrangements in which support structures 44 are omitted and head band 46 is directly attached to main housing portion 12M may also be used.

To allow head band 46 to stretch and fit snugly but comfortably around the user's head, head band 46 may incorporate one or more stretchable materials such as stretchable polyurethane, polyethylene terephthalate, silicone, elastomeric silicon, and/or other elastomeric materials. Due to the presence of stretchable materials in head band 46, head band 46 may return to its original length after being stretched to fit onto the user's head. This allows a user to stretch head band 46 around the user's head. If desired, the fabric forming head band 46 may contain non-stretchable strands of material (e.g., polyester, etc.). Non-stretchable strands of material may, for example, be used to provide head band 46 with strength and/or moisture management capabilities. Arrangements in which head band 46 is formed from post-consumer recycled plastics such as post-consumer recycled polyethylene terephthalate drawn textured yarn may sometimes be described herein as an illustrative example.

Figure 5:
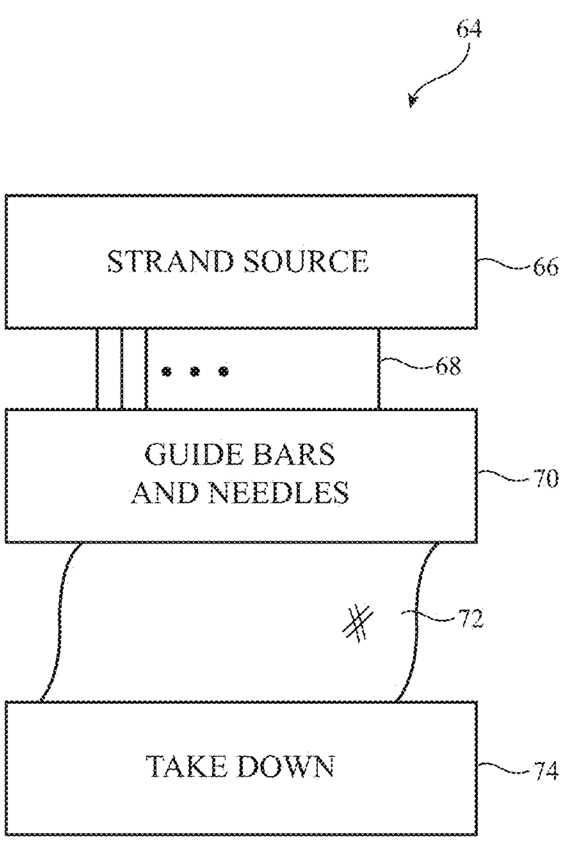
FIG. 5 is a schematic diagram of an illustrative knitting system in accordance with an embodiment.

A knitting machine or other equipment may be used in forming head band 46. FIG. 5 is a schematic diagram of an illustrative knitting system. As shown in FIG. 5, strand source 66 in knitting system 64 may be used in supplying strands 68 to guide and needle structures 70. Structures 70 may include strand guide structures (e.g., a system of movable guide bars with eyelets that guide strands 68) and needle systems (e.g., needle guide systems that guide sets of individually adjustable needles so that the needles may interact with the strands dispensed by the guide bars). During operations, a controller may control electrically adjustable positioners in system 64 to manipulate the positions of guide bars and needles in system 64 and thereby knit strands 68 into fabric 72. Take down 74 (e.g., a pair of mating rollers or other equipment forming a take down system) may be used to gather fabric 72 that is produced during knitting.

Figure 6:
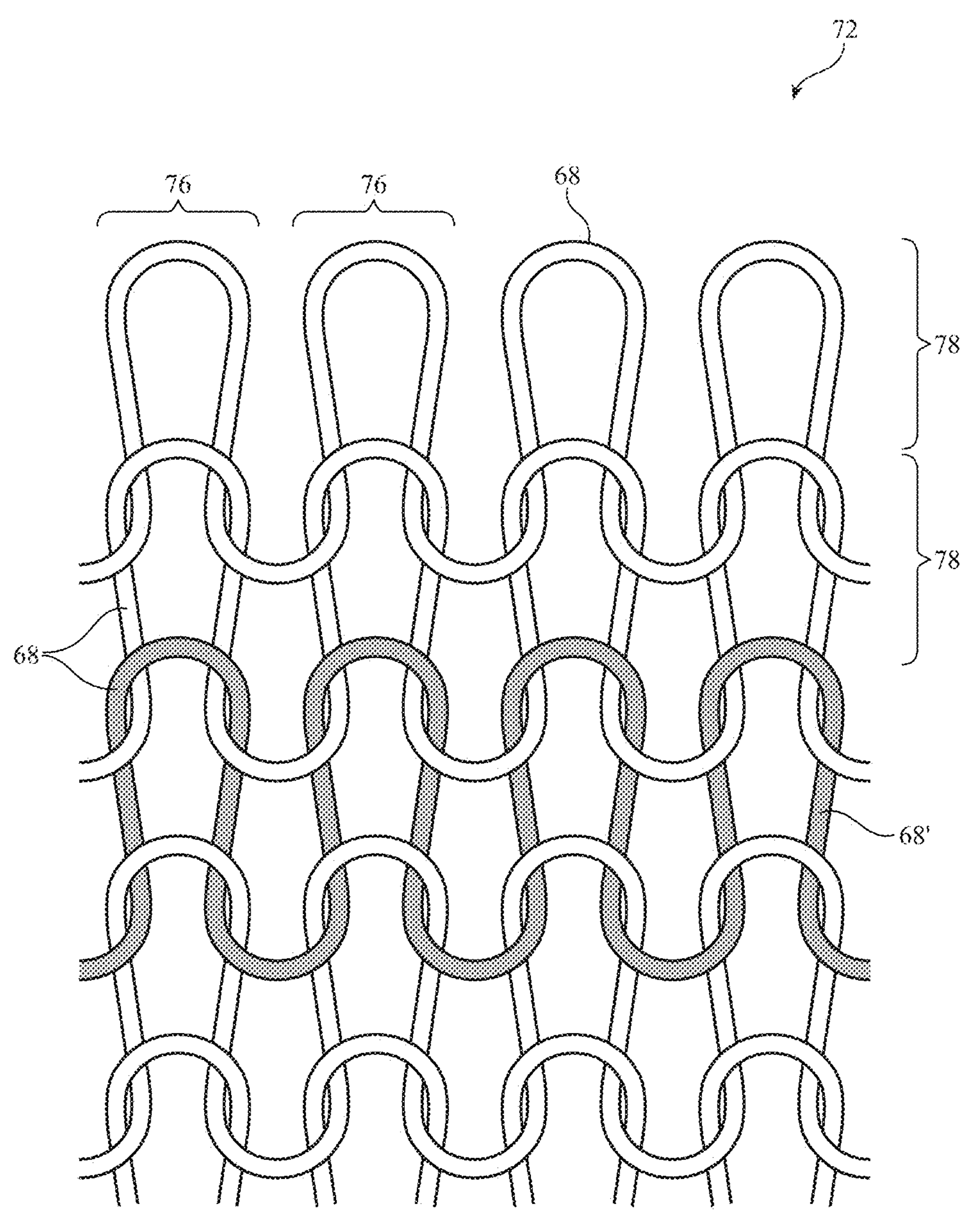
FIG. 6 is a diagram of a portion of an illustrative layer of knit fabric in accordance with an embodiment.

A layer of illustrative knit fabric 72 is shown in FIG. 6. A knit fabric is made up of courses 78 (e.g., rows of loops formed by strands 68) and wales 76 (e.g., columns of loops formed by strands 68). In a weft knit fabric of the type shown in FIG. 6 (sometimes referred to as a flat knit fabric), strands 68 form loops that extend horizontally across the fabric. An illustrative strand 68' among strands 68 has been highlighted to show the horizontal path taken by each strand 68 in fabric 72. In contrast, a warp knit fabric includes wales 76 formed from strands 68 that follow zig-zag paths vertically down the fabric.

The example of FIG. 6 is merely illustrative. Fabric 72 of head band 46 may include warp knit fabric, weft knit fabric, flat knit fabric, circular knit fabric, braided fabric, woven fabric, spacer fabric (e.g., inner and outer warp knit fabric layers joined by a spacer layer), and/or fabric formed using any other interlacing technique. Arrangements in which fabric 72 of head band 46 is a knit fabric are sometimes described herein as an example.

Figure 7:
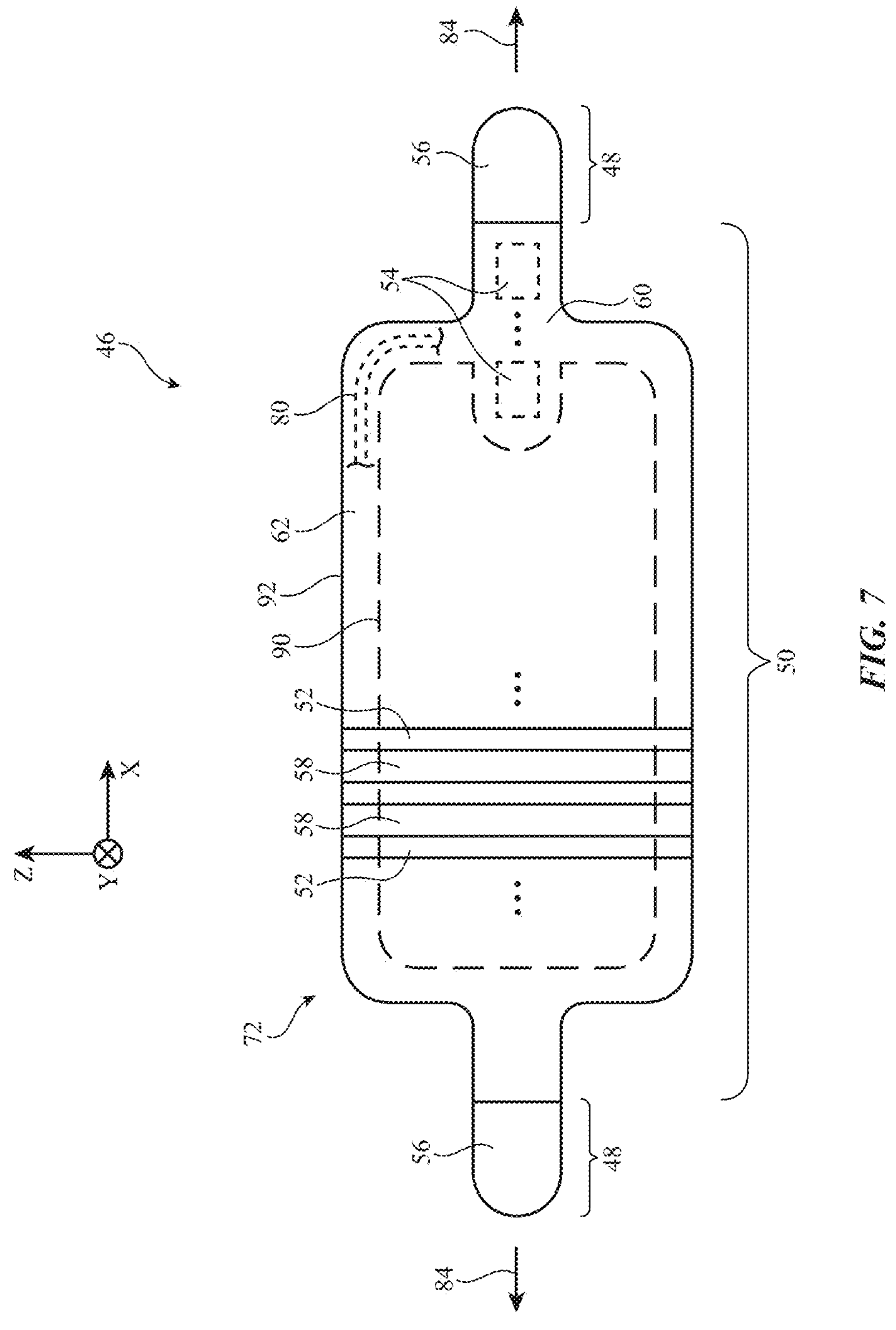
FIG. 7 is a rear view of an illustrative fabric band in accordance with an embodiment.

FIG. 7 is a rear view of an illustrative head band formed from fabric. As shown in FIG. 7, head band 46 may include fabric 72. To accommodate the different portions of a user's head, head band 46 may include different regions with different properties such as different amounts of stretch and cushioning. Some regions of head band 46 may include pockets whereas other regions of head band 46 may be free of pockets. Some regions of head band 46 may include ribs whereas other regions of head band 46 may be free of ribs. In the example of FIG. 7, head band 46 includes one or more ribbed regions such as ribbed region 50 and one or more smooth regions (e.g., regions without ribs) such as smooth end portions 48. Ribbed region 50 may be formed from a ribbed fabric and may include ribs 52 (e.g., elongated strip-shaped protrusions extending parallel to the Z-axis of FIG. 7 or extending along any other suitable direction). Ribs 52 of ribbed region 50 may extend across the entirety of head band 46 except for smooth regions 48, if desired. In other arrangements, smooth regions 48 may be omitted and ribs 52 may extend from edge-to-edge on head band 46.

Ribbed region 50 may be used in portions of head band 46 where extra cushion is needed such as portions contacting the back of a user's head. Smooth regions 48 may be used in portions of head band 46 that connect to other support structures in device 10. For example, smooth regions 48 may be coupled to rigid support structures 44 near the user's ears or temples and/or may be coupled directly to main housing portion 12M. Ribbed region 50 and smooth regions 48 may be formed from a single piece of fabric or may be formed from multiple pieces of fabric that are attached together using stitching, adhesive, hook-and-loop fasteners, and/or any other suitable attachment structure.

Smooth regions 48 of head band 46 may be formed from knit fabric, woven fabric, and/or any other suitable type of fabric. In the example of FIG. 7, smooth regions 48 are formed from flat knit fabric portions 56 (e.g., flat knit fabric of the type shown in FIG. 6). Ribbed region 50 may be interposed between a first flat knit portion 56 and a second flat knit portion 56. Flat knit portions 56 may be configured to attach to support structures 44 of temple housing portions 12T, and/or may be configured to attach directly to main housing portion 12M. Ribbed region 50 may extend around the back of a user's head, over the top of a user's head, and/or any other suitable location on the user's head.

Head band 46 may include one or more pockets (e.g., gaps between portions of fabric 72). In the example of FIG. 7, head band 46 includes pockets such as pocket 60 and pocket 62. Pockets 60 and 62 may be different portions of a single pocket or may be two separate pockets.

Pockets 62 and 60 may be bounded by portions of fabric 72. For example, dashed line 90 may indicate an inner boundary of pockets 62 and 60, whereas the outermost perimeter 92 of head band 46 may indicate an outer boundary of pockets 62 and 60. Along lines 90 and 92, upper and lower portions of fabric 72 may be attached together to form walls that define pockets 60 and 62. In the regions between lines 90 and 92, upper and lower portions of fabric 72 may be detached from one another to form a gap or cavity where components can be inserted.

Pocket 60 may be located only in smooth region 48 between portions of flat knit fabric 56, may be located only in ribbed region 50 between ribs 52, or may be located partially in smooth region 48 between portions of flat knit fabric 56 and in ribbed region 50 between ribs 52. In the example of FIG. 7, pocket 60 is located partially in ribbed region 50 and partially in smooth region 48, while pocket 62 is formed along some or all of the perimeter of head band 46. Pocket 62 may be located in ribbed region 50, or pocket 62 may be located in a border area of head band 56 that does not have ribs. Pocket 60 may be configured to receive one or more electrical components such as electrical components 54. Electrical components 54 may include wireless charging circuitry, input-output devices (buttons, touch sensors, rotating knobs or dials, microphones, other user input devices, status indicators, displays, speakers, other output devices, etc.), sensors, and/or other electrical components (e.g., components of the type described in connection with FIG. 3). Electrical components 54 may be contained entirely within pocket 60 or may have portions that are exposed on the exterior of head band 46. Pocket 62 may be configured to receive a cord such as cord 80. Cord 80 may be formed from braided strands of material, strands of material wrapped or twisted around a core, conductive strands, insulating strands, and/or other suitable materials. Cord 80 may be used to provide structure to the edges of head band 46 and/or may be used to provide adjustability to head band 46. For example, a user may be able to adjust how tightly head band 46 fits on the user's head by adjusting cord 80 in pocket 62. In other arrangements, cord 80 may be an electrical cable that is used to convey electrical signals (e.g., between electrical components 54 and electrical components in main housing portion 12M, between electrical components 54 on one end of head band 46 and electrical components 54 on an opposing end of head band 46, etc.).

In ribbed region 50, fabric 72 may include an inner stretchable fabric layer such as inner fabric layer 58. Inner fabric layer 58 may be formed from mesh fabric that allows layer 58 to stretch in directions 84. To provide cushioning on stretchable inner layer 58, fabric 72 may include one or more ribs such as ribs 52. Ribs 52 may be formed on one or both sides of inner fabric layer 58. For example, a first set of ribs 52 may be located on a first side of inner fabric layer 58, and a second set of ribs 52 may be located on a second opposing side of inner fabric layer 58. Ribs 52 may be formed from ottoman ribs, bengaline ribs, and/or any other suitable ribbed fabric construction. Ribs 52 may, for example, be formed from hollow (e.g., air-filled) protrusions on inner fabric layer 58. In other words, air pockets may be present in ribbed region 50 between the strands 68 that form ribs 52 and the strands 68 that form inner fabric layer 58. The presence of air inside of ribs 52 allows head band 46 to remain breathable and lightweight, while still having sufficient cushion to provide extra padding on the user's head.

If desired, fabric 72 that forms inner fabric layer 58 may have a lower gauge (e.g., a lower number of needles per inch) than fabric 72 that forms ribs 52. For example, the gauge of inner fabric layer 58 may be equal to one-half of the gauge of the fabric that forms ribs 52. By skipping a needle in inner fabric layer 58, larger openings may be present in inner fabric layer 58, thereby forming a stretchable mesh fabric layer that expands in directions 84 when device 10 is being worn and retracts back to its original position when device 10 is not being worn. Although ribs 52 have a higher gauge than inner fabric layer 58 and may therefore require more force to extend, ribs 52 may be formed on inner fabric layer 58 without increasing the required force needed to stretch head band 46 in directions 84. In particular, ribs 52 may have sufficient height relative to inner fabric layer 58 such that ribs 52 can freely expand and retract with inner fabric layer 58. The height of ribs 52 may be determined by the number of rows of loops that are used to form ribs 52. Each rib 52 may be formed with a higher number of rows of loops than that used to form the portion of inner fabric layer 58 under that given rib 52, so that ribs 52 can move with inner fabric layer 58 without actually requiring any stretching from ribs 52.

Ribs 52 may extend perpendicular to the direction of desired stretch. For example, as shown in FIG. 7, ribs 52 extend parallel to the Z-axis, which allows ribs 52 to stretch in directions 84 (e.g., parallel to the X-axis) when head band 46 is placed on a user's head. This is merely illustrative, however. Ribs 52 may extend in any suitable direction (e.g., parallel to the X-axis, oriented at an angle between the X-axis and the Z-axis, etc.). Arrangements in which different ribs 52 follow different paths may also be used. Ribs 52 may be segmented, curved, zig-zag, oriented in different angles, etc. Ribs 52 may all have the same size and be formed from the same materials and fabric construction, or ribs 52 may have one or more different characteristics such as different sizes, shapes, materials, fabric construction, etc.

Figure 8:
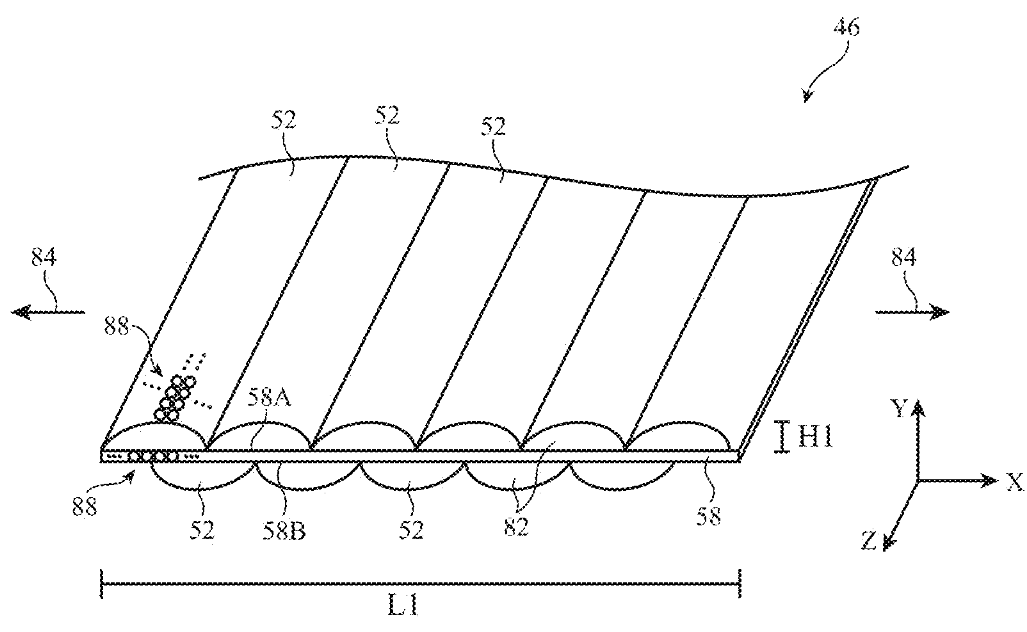
FIG. 8 is a perspective view of an illustrative fabric band in an unstretched state in accordance with an embodiment.
Figure 9:
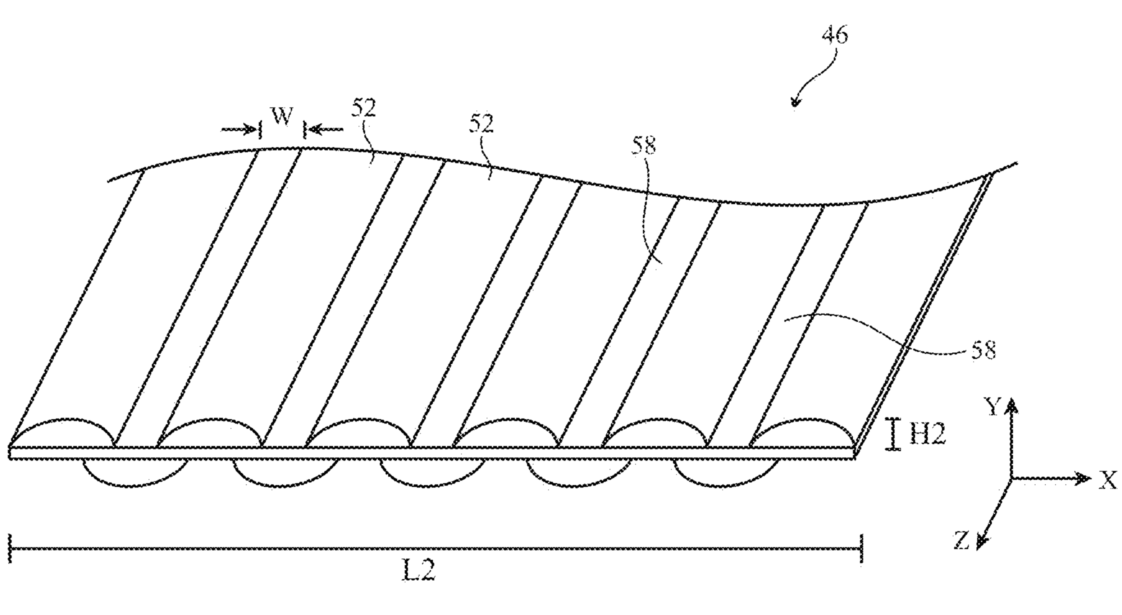
FIG. 9 is a perspective view of an illustrative fabric band in a stretched state in accordance with an embodiment.

FIGS. 8 and 9 are perspective views of ribbed region 50 of head band 46, showing how head band 46 may be operable in an unstretched state (FIG. 8) and a stretched state (FIG. 9).

As shown in FIG. 8, head band 46 may include a first set of ribs 52 on a first side 58A of stretchable inner fabric layer 58 and a second set of ribs 52 on a second opposing side 58B of stretchable inner fabric layer 58. One set of ribs 52 such as ribs 52 on first side 58A may contact the user's head when device 10 is being worn, while the other set of ribs 52 on second side 58B may face away from the user's head when device 10 is being worn. Ribs 52 on first side 58A may be offset from the ribs 52 on second side 58B, if desired.

Ribs 52 may be filled with air pockets. In particular, air-filled openings such as openings 82 may be formed in ribs 52. Openings 82 may extend parallel to ribs 52 and may be located between the fabric that forms ribs 52 and the fabric that forms inner fabric layer 58. This allows head band 46 to remain breathable and lightweight while still providing sufficient cushion and padding on the user's head.

When forming head band 46, strands 68 may be knitted into rows of loops such as loops 88. Each rib 52 may be supported by a portion of inner fabric layer 58. During knitting operations, knitting equipment 64 may knit a first set of rows of loops 88 to form a given one of ribs 52. The number of rows of loops 88 that are used to form each rib 52 will determine the height of that rib relative to inner fabric layer 58. After forming a first rib 52 on a first side 58A, knitting equipment 64 may then knit rows of loops 88 to form a given portion of inner fabric layer 58 that will support the first rib 52. Knitting equipment 64 may then knit rows of loops 88 to form a second rib 52 on second side 58B, followed by knitting rows of loops 88 to form another portion of inner fabric layer 58 that will support the second rib 52. This process may continue in an alternating fashion, with knitting equipment 64 knitting rows of loops 88 for a rib on one side, then knitting rows of loops 88 to form a portion of inner fabric layer 58 for supporting that rib, then knitting rows of loops 88 for a rib 52 on the other side, then knitting rows of loops 88 to form a portion of inner fabric layer 58 for supporting that rib, etc. When head band 46 is in the unstretched state of FIG. 8, inner fabric layer 58 may not be visible between ribs 52 (or may be barely visible between ribs 52).

Ribs 52 may have sufficient height relative to inner fabric layer 58 so that ribs 52 can accommodate stretching of inner fabric layer 58 without increasing or significantly increasing the force needed to extend inner fabric layer 58. The height of ribs 52 relative to inner fabric layer 58 may be determined by the number of rows of loops 88 that are used to form ribs 52 and the number of rows of loops that are used to from inner fabric layer 58. To provide ribs 52 with sufficient height relative to inner fabric layer 58, the number of rows of loops 88 that are used to form a given rib 52 may be greater than the number of rows of loops 88 that are used to form the portion of inner fabric layer 58 that supports that given rib 52. This allows ribs 52 to move with inner fabric layer 58 as inner fabric layer 58 is stretched in directions 84. For example, when device 10 is not being worn and head band 46 is in the unstretched state of FIG. 8, ribs 52 are at a maximum height of H1 relative to inner fabric layer 58 and ribbed region 50 may have a first length L1 along the X-axis. When device 10 is being worn and head band 46 is in the stretched state of FIG. 9, ribs 52 are at a lower height H2 (e.g., a height lower than height H1 of FIG. 8) relative to inner fabric layer 58 and ribbed region 50 may have a second length L2 along the X-axis (e.g., a length greater than length L1). Stretching head band 46 from length L1 to length L2 may also expose more of inner fabric layer 58 between ribs 52 than when head band 46 is unstretched (see exposed width W of inner fabric layer 58 between adjacent ribs 52 of FIG. 9). In addition to accommodating stretching of inner fabric layer 58, ribs 52 may permit bending of inner fabric layer 58. Head band 46 may curve around the user's head, thereby bending around one or more axes that are parallel to the direction of ribs 52. The raised height of ribs 52 relative to inner fabric layer 58 may allow ribs 52 to move with inner fabric layer 58 as it bends, rather than inhibiting bending movement.

Figure 10:
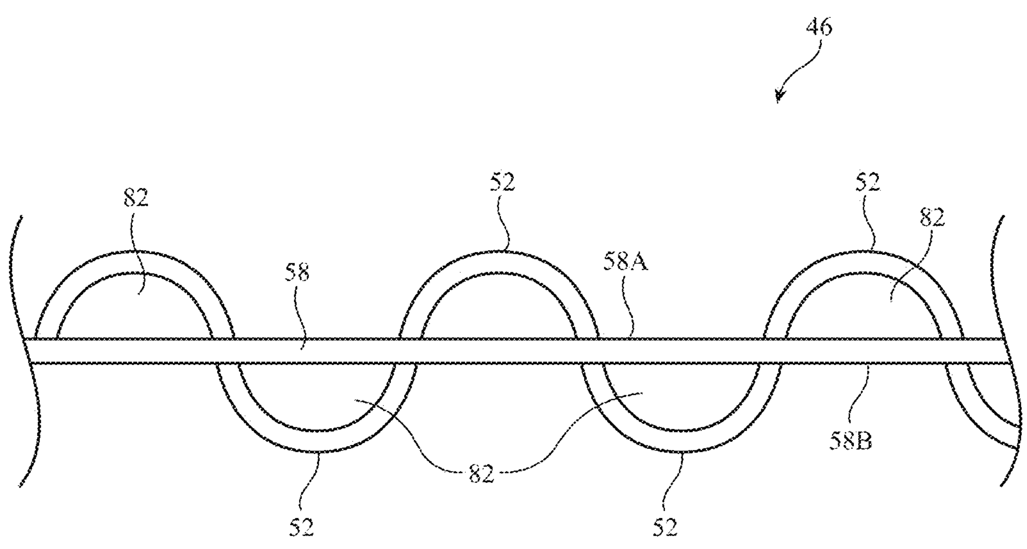
FIG. 10 is a side view of an illustrative fabric band with first and second sets of ribs on respective first and second opposing sides of the fabric band in accordance with an embodiment.

FIG. 10 is a side view of head band 46 showing how ribs 52 may form a sinusoidal or accordion shape on inner fabric layer 58. As shown in FIG. 10, ribs 52 may include a first set of ribs 52 on first surface 58A of inner fabric layer 58 and a second set of ribs 52 on a second opposing surface 58B of inner fabric layer 58. Openings 82 may pass through ribs 52 and may provide an air gap between ribs 52 and inner fabric layer 58, which allows head band 46 to remain breathable, flexible, stretchable, and lightweight, while also providing cushioning on the user's head.

Figure 11:
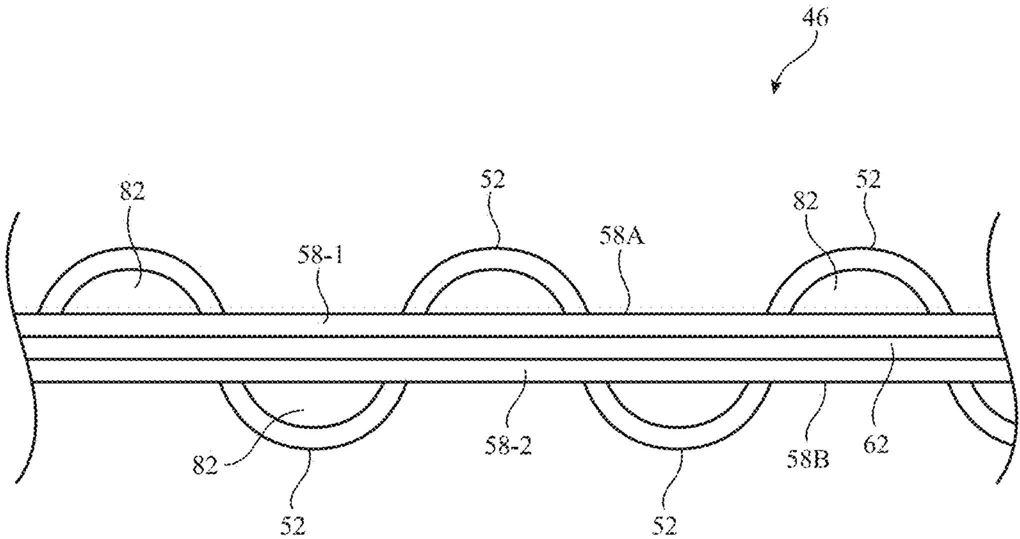
FIG. 11 is a side view of an illustrative fabric band with first and second sets of ribs separated by a pocket in accordance with an embodiment.

In some arrangements, a pocket may extend into ribbed region 50 of head band 46. To form a pocket in ribbed region 50 of head band 46, inner fabric layer 58 may be separated into first and second layers. This type of arrangement is illustrated in FIG. 11. As shown in FIG. 11, inner layer 58 may be separated into first and second layers such as first inner fabric layer 58-1 and second inner fabric layer 58-2. First inner fabric layer 58-1 may support a first set of ribs 52 on first side 58A, while second inner fabric layer 58-2 may support a second set of ribs 52 on opposing second side 58B. Portions of inner fabric layers 58-1 and 58-2 may be decoupled from one another to form pocket 62 (and, if desired, to form pocket 60).

Figure 12:
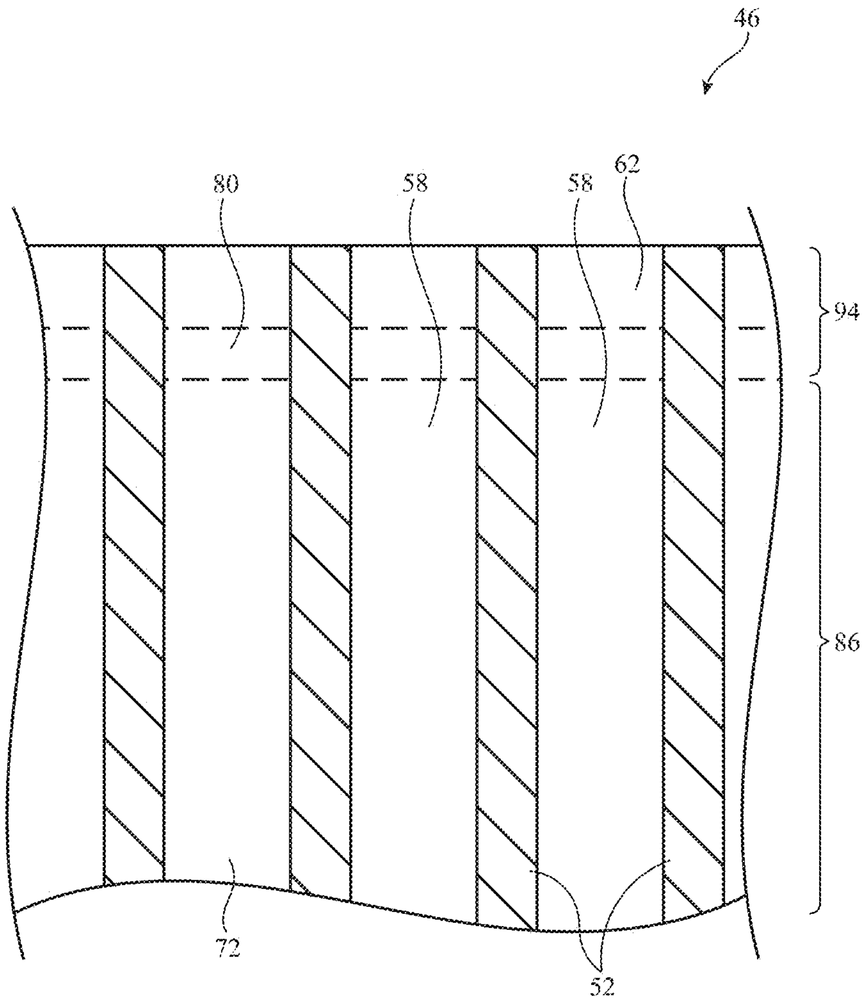
FIG. 12 is a top view of an illustrative fabric band having ribs and a cord that extends across the ribs through a pocket in accordance with an embodiment.

FIG. 12 is a top view of head band 46 showing how a cord may pass through pocket 62. As shown in FIG. 12, head band 46 may edge region 94 with pocket 62. Pocket 62 may extend along an outer edge of head band 46. In region 94, inner fabric layer 58 may have upper and lower portions such as upper and lower portions 58-1 and 58-2 of FIG. 11 to create pocket 62 between upper and lower portions 58-1 and 58-2. In portions of head band 46 that do not have a pocket, such as region 86, head band 46 may include a single inner fabric layer 58, as illustrated in FIG. 10. This may be achieved by joining upper and lower portions 58-1 and 58-2 in region 86, or may be achieved by having only one of upper and lower portions 58-1 and 58-2 extend into region 86 to form inner fabric layer 58. From an exterior perspective, there may be little to no visual distinction between pocket region 94 and pocket-free region 86. By incorporating pocket 62 into ribbed portion 50 of head band 46, a user's head may be cushioned from the items contained within pocket 62. For example, cord 80 passing through pocket 62 may be separated from a user's head by a set of ribs 52, which helps minimize user discomfort resulting from cord 80.

If desired, rods may be inserted into openings 82 of ribs 52 after ribs 52 have been formed and while fabric 72 of head band 46 undergoes additional processing. For example, metal rods that are cut to the length of ribs 52 may be inserted into respective openings 82 while post-processing steps take place such as steaming, washing, coating, treating, etc. After post-processing steps are complete, the rods may be removed from ribs 52, leaving air-filled openings 82 in place. If desired, rods may be inserted into openings 82 through the sides of ribs 52 (e.g., rather than at the opposing ends of ribs 52) so that any gaps resulting from inserting the rods are hidden from view between ribs 52.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head band for supporting a head-mounted device, the head band comprising:

first and second flat knit portions;

a ribbed fabric extending between the first and second flat knit portions, wherein the ribbed fabric is configured to stretch in a first direction and has ribs extending in a second direction that is perpendicular to the first direction;

a pocket located along an edge of the ribbed fabric;

a cord located in the pocket and configured to adjust a fit of the head band; and an additional pocket located in the first flat knit portion, wherein the ribbed fabric has a pocket-free region overlapping the ribs and extending between the pocket and the additional pocket.

2. The head band defined in claim 1 further comprising an electrical component in the additional pocket.

3. The head band defined in claim 2 wherein the electrical component comprises a user input device.

4. The head band defined in claim 1 wherein the ribbed fabric comprises a stretchable inner layer, a first set of ribs on a first surface of the stretchable inner layer, and a second set of ribs on a second opposing surface of the stretchable inner layer.

5. The head band defined in claim 4 wherein the first set of ribs is offset from the second set of ribs.

6. The head band defined in claim 5 further comprising openings that each pass through a respective one of the ribs in the first and second sets of ribs.

7. The head band defined in claim 4 wherein a height of the first and second sets of ribs relative to the stretchable inner layer is configured to change as the ribbed fabric is stretched.

8. The head band defined in claim 4 wherein the stretchable inner layer comprises a mesh fabric.

9. The head band defined in claim 4 wherein the stretchable inner layer has a lower gauge than the first and second sets of ribs.

10. The head band defined in claim 1 wherein the ribbed fabric comprises first and second stretchable inner layers, a first set of ribs on the first stretchable inner layer, and a second set of ribs on the second stretchable inner layer.

11. The head band defined in claim 10 wherein the pocket is located between the first and second stretchable inner layers.

12. A head band for supporting a head-mounted device, the head band comprising:

a mesh inner fabric layer;

a first set of ribs located on a first side of the mesh inner fabric layer;

a second set of ribs located on a second side of the mesh inner fabric layer;

first and second pockets located between the first and second sets of ribs, wherein the first pocket is defined by a first boundary and the second pocket is defined by a second boundary, and wherein the first and second boundaries are located between the first and second pockets; and a cord that passes through the first pocket.

13. A head band for supporting a head-mounted device on a user's head, the head band comprising:

a mesh inner fabric layer;

a first set of ribs located on a first side of the mesh inner fabric layer;

a second set of ribs located on a second side of the mesh inner fabric layer;

a pocket located between the first and second sets of ribs;

a cord that passes through the pocket; and a pocket-free region located between the first and second sets of ribs.

14. The head band defined in claim 13 wherein the mesh inner fabric layer is one of two mesh inner fabric layers located between the first and second sets of ribs and wherein the pocket is located between the two mesh inner fabric layers.

15. The head band defined in claim 13 wherein the pocket is located along an outer edge of the head band.

16. A head band configured to be coupled to a head-mounted device, the head band comprising:

first and second end portions without ribs;

a ribbed fabric extending between the first and second end portions, wherein the ribbed fabric has first and second opposing sides and ribs located on the first and second opposing sides;

a pocket;

a user input device mounted in the pocket;

an additional pocket located in the ribbed fabric, wherein the additional pocket is bounded on a first side by an edge of the ribbed fabric and is bounded on an opposing second side by a pocket-free region of the ribbed fabric; and a cord located in the additional pocket and configured to adjust a fit of the head band.

17. The head band defined in claim 16 wherein the pocket is located in the first end portion.

18. The head band defined in claim 16 wherein the first and second end portions comprise flat knit fabric and wherein the ribbed fabric comprises a mesh fabric layer on which the ribs are formed.

* * * * *